United States Patent Office 3,530,198
Patented Sept. 22, 1970

3,530,198
PROCESS FOR PREPARATION OF OLEFINS
Donald M. Fenton, Anaheim, Calif., assignor to Union Oil Company of California, Los Angeles, Calif., a corporation of California
No Drawing. Filed Apr. 2, 1968, Ser. No. 718,264
Int. Cl. C07c 1/20
U.S. Cl. 260—682                                    19 Claims

ABSTRACT OF THE DISCLOSURE

A process for preparation of olefins from carboxylic acids, esters, anhydrides or acid halides comprising contacting the acid, ester, anhydride or acid halide with a complex catalyst comprising a Group VIII noble metal and a biphyllic ligand from the group consisting of organic phosphines, arsines and stibines. The olefins find utility in a wide variety of applications, e.g., production of acids, esters, anhydrides, acid halides, aldehydes, ketones, amines, amides, oxides, hydrocarbon polymers, oxo alcohols, etc. These products in turn find extensive utility in diverse fields such as detergents, solvents, plastics, etc.

---

This invention relates to a process for preparing olefins from carboxylic acids, esters, anhydrides or acid halides by contacting these compounds with a complex catalyst comprising a Group VIII noble metal and a biphyllic ligand from the group consisting of organic phosphines, arsines or stibines. The reaction involves decomposition of the acid, ester, anhydride or acid halide to form an olefin, carbon monoxide and water, an alcohol, or a hydrogen halide according to the following equations:

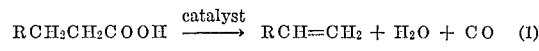

$$RCH_2CH_2COOH \xrightarrow{catalyst} RCH=CH_2 + H_2O + CO \quad (1)$$

$$RCH_2CH_2COOR \xrightarrow{catalyst} RCH=CH_2 + ROH + CO \quad (2)$$

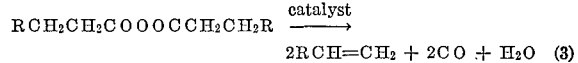

$$RCH_2CH_2COOOCCH_2CH_2R \xrightarrow{catalyst}$$
$$2RCH=CH_2 + 2CO + H_2O \quad (3)$$

$$RCH_2CH_2COX \xrightarrow{catalyst} RCH=CH_2 + HX + CO \quad (4)$$

where the catalyst comprises a complex of a Group VIII noble metal and an organic phosphine, arsine or stibine.

Exemplary of the utility of the process of the invention is its employment in conjunction with carbon monoxide insertion reactions. Typical of such reactions is the reaction of an olefin with carbon monoxide and water to form an acid. However, this reaction generally results in formation of a mixture of normal and iso acids, as illustrated by the following equation:

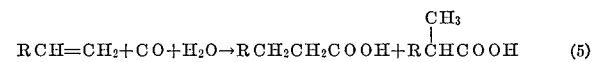

$$RCH=CH_2 + CO + H_2O \rightarrow RCH_2CH_2COOH + R\overset{CH_3}{\underset{|}{CH}}COOH \quad (5)$$

Frequently it is desirable to obtain a product that is largely or entirely composed of either the normal acid or the iso acid, rather than a mixture of the two. For example, the normal acid is generally desired for preparation of detergents.

It has now been found that this objective may be achieved by separation of the normal and iso products by conventional means, e.g., distillation, followed by reconversion of the undesired acid to the olefin. The olefin is then again reacted with carbon monoxide and water to obtain an additional fraction of the desired product. By means of such a cyclic process the olefin may be converted substantially entirely to the desired product. Similar procedures are applicable to preparation of esters, anhydrides or acid halides.

The process of the invention is applicable to any carboxylic acid having at least 3 carbon atoms and having a hydrogen on the beta carbon, or to the ester, anhydride or halide derivatives thereof. One suitable group of acids are the aliphatic monocarboxylic acids defined by the formula

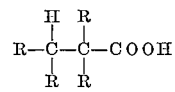

$$R-\overset{H}{\underset{R}{\overset{|}{C}}}-\overset{R}{\underset{R}{\overset{|}{C}}}-COOH$$

where the R's may be hydrogen or the same or different alkyl, aryl, alkaryl, aralkyl or cycloalkyl radicals. These acids may be saturated or unsaturated and may contain 20 or more carbon atoms. Examples are propionic acid, normal or iso-butyric acid, caproic acid, octanoic acid, lauric acid, palmitic acid, stearic acid, oleic acid, etc.

Cycloalphatic acids, such as cyclohexane carboxylic acid, may also be employed as reactants in the process of the invention. The acids may include other substituent groups such as hydroxy, carbonyl halo, etc.

Suitable esters include esters of the above acids and any monohydric alcohol having from about 2 to 20 carbon atoms. The alcohols may be saturated or unsaturated, alicyclic or aromatic. Also, esters of glycol or glycerol may be used. Preferred alcohols are aliphatic or cycloaliphatic alcohols such as methanol, ethanol, propanol, isopropanol, butanol, pentanol, hexanol, octanol, decanol, cyclohexanol, etc.

The anhydrides and halides may also be derived from any of the above acids or, in the case of the anhydrides, mixtures of these acids. The halides may be any of fluorine, chlorine, bromine or iodine. The acid chlorides are, however, preferred.

The catalyst employed in the present invention comprises a complex of Group VIII noble metal and a biphyllic ligand of phosphorus, arsenic or antimony.

The Group VIII noble metal can be palladium, rhodium, ruthenium, platinum, osmium or iridium. While catalysts containing any of these metals may be used in the reaction, palladium-containing catalysts are preferred because of their greater activity, particularly at relatively mild reaction conditions.

A catalytic quantity of the Group VIII noble metal-containing catalyst is used. This is generally an amount sufficient to provide a concentration of the Group VIII noble metal which is between about 0.002 and about 2.0 weight percent of the liquid reaction medium and preferably between about 0.05 and about 0.5 weight percent. The Group VIII noble metal can be added to the reaction medium as the metal itself or as a soluble salt, a carbonyl compound or a chelate. Examples of suitable salts are the nitrates and halides of the metals such as palladium chloride, palladium nitrate, rhodium acetate, ruthenium bromide, osmium fluoride, palladium chloride, etc. Examples of suitable chelates are palladium acetylacetonate and complexes of the platinum group metal ions with such conventional chelating agents as ethylenediamine tetraacetic acid and its alkali metal salts, citric acid, etc. The metal may be supported on an inert support such as carbon.

The biphyllic ligands comprise organic compounds having at least 3 carbons and containing arsenic, antimony or phosphorus in a trivalent state. Of these, the phosphorus compounds, i.e., the phosphines, are preferred; however, the arsines and stibines can also be employed. In general these biphyllic ligands have the following structure:

$$E(R)_3$$

or the following structure:

$$(R)_2ER'E(R)_2$$

wherein E is a trivalent atom selected from the class consisting of phosphorus, arsenic and antimony; and wherein R is a member of the class consisting of hydrogen, alkyl from 1 to 8 carbon atoms, aryl from 6 to 8 carbons and halo and alkoxy substitution products thereof; and
wherein R' is alkylene having from 1 to about 8 carbons.

In addition, ligands with the following general structure

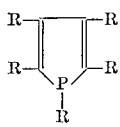

when R is hydrogen, alkyl or aryl may be used.

Examples of suitable biphyllic ligands having the aforementioned structure and useful in my invention to stabilize the catalyst composition are the following: trimethyl phosphine, triethyl arsine, triisopropyl stibine, ethyldiisopropyl stibine, tricyclohexyl phosphine, triphenyl phosphine, tri(o-tolyl)phosphine, phenyl diisopropyl phosphine, phenyl diamyl phosphine, diphenylethyl phosphine, tris-panisyl phosphine, tris(diethylaminomethyl)phosphine, ethylene bis(diphenyl phosphine), hexamethylene bis(diisopropyl arsine), pentamethylene bis(diethylstibine), 1,2,5-triphenylphosphol, etc. Of the aforementioned, the aryl phosphines are preferred because of their greater activity.

It has also been found that the reactions of the invention are often further accelerated by the presence of a cocatalyst consisting of an alkali metal halide. This may be a compound of any of the alkali metals, i.e., lithium, sodium, potassium, rubidium or cesium, and any of the halogens, i.e., fluorine, chlorine, bromine or iodine. The alkali metal halide is generally used in an amount of about one-tenth to about ten times the weight of the noble metal, although optimum amounts may vary greatly depending on the specific reaction and reaction conditions involved.

The reaction is performed under liquid phase conditions and when the carboxylic acid, ester, anhydride or acid halide is a liquid at the reaction conditions this material can be used in excess to provide the liquid reaction medium. If desired, however, any suitable organic liquid can be employed as a reaction solvent, preferably organic solvents which are inert to the reaction conditions, the reactants, the catalyst and the products. These include hydrocarbons such as the aromatics, aliphatics or alicyclic hydrocarbons, ethers, ketones, etc. Examples are naphthalene, o-dichlorobenzene, etc.

The reaction is performed under relatively mild conditions including temperatures from about 100 to about 300° C., preferably from about 150 to about 250° C. Sufficient pressure is used to maintain the reaction medium in liquid phase. Although superatmospheric pressure can be used, the rate of reaction is increased by subatmospheric pressures and, therefore, pressures from about $10^{-4}$ to about 300 atmospheres, and preferably from about $10^{-1}$ to about 20 atmospheres, may be used. Preferably, temperature and pressure conditions are such as to insure substantial removal of the olefin product from the reaction zone as it is formed, as by distillation. Failure to remove the olefin product from the reaction zone may result in undesirable side reactions of the olefin with other compounds in the reaction zone.

The following examples will more specifically illustrate the practice of the invention.

EXAMPLE 1

To ½ g. palladium chloride, 3 g. triphenylphosphine and 100 g. cyclohexanecarboxylic acid in a 500 ml. three-necked flask equipped with a Dean Stark Trap and thermometer well and magnetically stirred, was added heat to 200° C. Distillation over a 6 hour period yielded some water and 5 g. cyclohexene.

EXAMPLE 2

To 50 ml. cyclohexanecarbonyl chloride, ½ g. palladium chloride bistriphenylphosphine and 2 g. triphenylphosphine in a 100 ml. flask was added heat to reflux. Hydrogen chloride gas was evolved. There was found 15.5% cyclohexene.

EXAMPLE 3

To 100 ml. of a mixture of nonanoic and α-methyloctanoic acids in the ratio of 1.25 was added 2 g. palladium chloride bistriphenylphosphine and 2 g. triphenylphosphine in a 500 ml. flask. The mixture was refluxed and the distillate was caught in a Dean Stark Trap. The distillate contained 36% 1-octene, 26% trans-2-octene and 11% cis-2-octene.

EXAMPLE 4

To 100 ml. of octanoic acid, 2 g. triphenylphosphine and 1 g. of a palladium complex, M.P. 120–130° C., and analyzing as $PdHCl(\phi_3P)_2$, in a 500 ml. flask was added heat to reflux for 4 hours. The effluent was caught in a Dean Stark Trap and analyzed as 63% 1-heptene, 15% trans-2-heptene and 6% cis-2-heptene.

EXAMPLE 5

To ½ g. palladium chloride, 1½ g. bis(diphenylphosphine)ethylene and 100 ml. octanoic acid in a 250 ml. flask equipped with a Dean Stark Trap was added heat to reflux for 4 hours. 5 g. of olefin and 1 g. of water were distilled.

EXAMPLE 6

To 75 ml. isobutyl decanoate, 1 g. palladium chloride bistriphenylphosphine, 3 g. triphenylphosphine and 2 g. lithium chloride in a 250 ml. flask equipped with a Dean Stark Trap was added heat to 240° C. for 2 hours. A two phase liquid distillate was collected. The lower phase, 0.3 ml., was 85% isobutanol and 7% 1-nonene. The upper phase, 3 ml., was 43% 1-nonene, 24% trans-2-nonene, 5% cis-2-nonene and 14% isobutanol. Without the lithium chloride the same reaction took place but was much slower.

EXAMPLE 7

To 100 ml. pivalic anhydride and 1 g. palladium chloride bistriphenylphosphine in a 250 ml. flask equipped with a Dean Stark Trap was added 2 g. triphenylphosphine. The mixture was heated and magnetically stirred. Around 150° C. gases were evolved and passed through a Dry Ice-cooled trap. Around 165° C. 48 g. of pivalic acid was distilled and collected in the Dean Stark Trap. Some isobutylene was found in the Dry Ice-cooled trap and a portion was added to a carbon tetrachloride solution containing bromine. The solution was rapidly decolorized.

I claim:
1. A process for preparation of olefins comprising contacting a reactant from the group consisting of carboxylic acids, esters, anhydrides and acid halides at elevated temperature with a complex catalyst comprising a Group VIII noble metal and a biphyllic ligand from the group consisting of organic phosphines, arsines and stibines.
2. The process of claim 1 in which the olefin is removed from the reaction zone as it is formed.
3. The process of claim 1 in which the reactant is a carboxylic acid.
4. The process of claim 3 in which the acid is octanoic acid.
5. The process of claim 3 in which the acid is cyclohexane carboxylic acid.
6. The process of claim 1 in which the reaction is carried out in an organic solvent.
7. The process of claim 3 in which the acid is nonanoic acid.
8. The process of claim 3 in which the acid is α-methyloctanoic acid.

9. The process of claim 1 in which the reactant is a carboxylic acid ester.

10. The process of claim 9 in which the ester is isobutyl decanoate.

11. The process of claim 1 in which the reactant is a carboxylic acid anhydride.

12. The process of claim 11 in which the anhydride is pivalic anhydride.

13. The process of claim 1 in which the reactant is a carboxylic acid chloride.

14. The process of claim 13 in which the acid chloride is cyclohexanecarbonyl chloride.

15. The process of claim 1 in which the Group VIII noble metal is palladium.

16. The process of claim 1 in which the biphyllic ligand is a triaryl phosphine.

17. The process of claim 16 in which the phosphine is triphenyl phosphine.

18. The process of claim 1 additionally employing a cocatalyst consisting essentially of an alkali metal halide.

19. The process of claim 18 in which the alkali metal halide is lithium chloride.

References Cited

Prince & Raspin: "Olefin Formation From Saturated Aldehydes and Acids," Chem. Comm. 1966, 156–7.

DELBERT E. GANTZ, Primary Examiner

G. E. SCHMITKONS, Assistant Examiner

U.S. Cl. X.R.

260—638, 666